United States Patent [19]
Heil et al.

[11] Patent Number: 6,029,338
[45] Date of Patent: Feb. 29, 2000

[54] BINDING FOR WINDING OVERHANGS OF ROTORS OF ELECTRIC MACHINES, AND METHOD OF PRODUCING BINDINGS FOR WINDING OVERHANGS

[75] Inventors: Werner Heil, Lupfig; Vishal Mallick, Birmenstorf; François Meynard, Toinex; Karl Parfrey, Ennetbaden; Herbert Prenner, Birmenstorf, all of Switzerland

[73] Assignee: ABB Research Ltd., Zurich, Switzerland

[21] Appl. No.: 09/239,536

[22] Filed: Jan. 29, 1999

Related U.S. Application Data

[62] Division of application No. 08/839,316, Apr. 17, 1997, Pat. No. 5,900,689.

[30] Foreign Application Priority Data

Apr. 18, 1996 [DE] Germany .......................... 196 15 189
Aug. 30, 1996 [DE] Germany .......................... 196 35 295

[51] Int. Cl.[7] ................................................. H02K 15/02
[52] U.S. Cl. ................................ 29/598; 29/606; 29/608; 29/605; 310/271; 310/270; 310/200; 156/172; 156/169; 156/180; 73/432; 412/97
[58] Field of Search .................................. 310/271, 270, 310/200; 412/97; 73/432; 156/172, 169, 180; 29/958, 606, 608, 605

[56] References Cited

U.S. PATENT DOCUMENTS

| | | | |
|---|---|---|---|
| 2,896,100 | 7/1959 | Axelson . | |
| 2,949,555 | 8/1960 | Paul | 310/271 |
| 3,312,847 | 4/1967 | Waclaw | 310/271 |
| 3,562,569 | 2/1971 | Koechlin | 310/214 |
| 3,694,907 | 10/1972 | Margrain et al. | 29/598 |
| 3,784,429 | 1/1974 | Muller . | |
| 3,964,341 | 6/1976 | Rabenhorst | 74/572 |
| 4,561,306 | 12/1985 | Marino et al. . | |
| 4,661,183 | 4/1987 | Beard | 156/172 |
| 4,790,808 | 12/1988 | Piramoon | 494/81 |
| 4,790,898 | 12/1988 | Woods | 156/166 |
| 5,900,689 | 5/1999 | Heil et al. | 310/271 |

FOREIGN PATENT DOCUMENTS

| | | |
|---|---|---|
| 939464 | 2/1956 | Germany . |
| 1778261 | 9/1956 | Germany . |
| 3012100A1 | 10/1981 | Germany . |
| 3842074A1 | 6/1990 | Germany . |

OTHER PUBLICATIONS

"Rotorbandagen aus vorimpragniertem Glasfaserband", Dreyfuss MICAFIL, 7/63, pp. 1–7.

"Befestigung der Wicklungen", Herstellung der Wicklungen elektrischer Maschinen, H. Sequenz, pp. 236–237.

*Primary Examiner*—Nestor Ramirez
*Attorney, Agent, or Firm*—Burns, Doane, Swecker & Mathis, L.L.P.

[57] ABSTRACT

In a binding (19) for winding overhangs (20) of rotors (1) of electric machines, essentially comprising a plastic matrix with fibrous material embedded therein, the binding (19) is formed by winding a fiber tape (15) onto the winding overhang (20). The plastic matrix is composed of a thermoplastic. Furthermore, a method is described for applying the fiber tape to the winding overhang of an electric machine.

4 Claims, 3 Drawing Sheets

BINDING FOR WINDING OVERHANGS OF ROTORS OF ELECTRIC MACHINES, AND METHOD OF PRODUCING BINDINGS FOR WINDING OVERHANGS

This application is a divisional of application Ser. No. 08/839,316, filed Apr. 17, 1997 now U.S. Pat. No. 5,900,689.

BACKGROUND OF THE INVENTION

1. Field of the Invention

The invention relates to a binding for winding overhangs of rotors of electric machines in accordance with the preamble of the first claim. It likewise relates to a method of producing a binding in accordance with the preamble of the independent method claim.

2. Discussion of Background

Such bindings for winding overhangs of rotors of electric machines are known from "Herstellung der Wicklung elektrischer Maschinen" [Production of the winding of electric machines], edited by H. Sequent, Springer Verlag, page 236 f. There, the windings of winding overhangs of the rotors of electric machines are retained by bindings made of steel wire or glass fibers impregnated with resin. A further mounting and supporting of winding overhangs, not described in that document, are cap rings. The wire bindings are formed from as far as possible only one layer of wire turns lying closely adjacent to one another. An insulating layer is placed between binding and winding. Bronze or nonmagnetic steel is used as winding wire material.

The thermosetting glass fiber bindings are composed of glass fiber tapes preimpregnated with resin, which are wound in multiple layers around the winding overhang. Advantages in terms of construction and production result from the use of thermosetting glass bindings. On the market, the widest possible range of glass fiber tapes with a thermosetting matrix can be obtained, for example glass fibers which are impregnated with a solvent-free resin. During the binding, operations are carried out with a pretension which is as high as possible, the maximum applicable pretension being dependent on the tensile strength of the glass fiber tape. The thermosetting binding material is heated so intensively by a heat source that the resin becomes liquid. As a result of the pretension, outer layers already penetrate into the lower layers during the binding, which results in a certain proportion of the pretension being lost before the resin has hardened. The pretension must be applied during the processing in such a way that the pretension remaining in the hardened material is sufficient to compensate for the centrifugal forces in the winding overhangs during operation. The advantages of glass bindings over wire bindings are, inter alia, the reduction in cost of the final product, special insulating layers are dispensed with, the specific elasticity is higher, lower loading by the centrifugal force as a result of lower weight, and so on.

However, the thickness of the binding needed is decisive as the selection criterion for the application of glass bindings or steel bindings for winding overhangs. Starting at a thickness of the thermosetting glass binding of over 8 mm, further turns of thermosetting fibrous material which are applied no longer have any effect on the strength of the glass binding. Therefore, when greater strength is needed, the glass bindings are replaced by steel bindings.

SUMMARY OF THE INVENTION

Accordingly, one object of the invention is to provide novel bindings with a higher pretension and hence a higher strength at as low a thickness as possible in the case of a binding for winding overhangs of rotors of electric machines of the type mentioned at the beginning.

According to the invention, this is achieved by the features of the first claim.

The core of the invention is therefore that the plastic matrix of the fiber tapes is composed of a thermoplastic.

The advantages of the invention can be seen, inter alia, in the fact that during the application of the thermoplastic fiber tapes, no losses in pretension arise as a result of relaxation. As a result, more pretension can be applied per turn of the thermoplastic fiber tapes, which results in fewer layers of fiber tapes being needed in order to achieve a specific pretension and strength. This means that the thickness of the thermoplastic bindings can be reduced over thermosetting bindings, by which means the heat occurring during the operation of the rotor can be dissipated better. Furthermore, previously used steel bindings can be replaced by the thermoplastic bindings because of the low thickness needed of the thermoplastic bindings. A further advantage is the short time which is needed for the production of a thermoplastic binding and the low production costs, resulting therefrom, of such bindings.

Further advantageous embodiments of the invention emerge from the subclaims.

Moreover, a method of producing a binding of the generic type is further specified.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only those elements which are essential for an understanding of the invention are shown.

DESCRIPTION OF THE PREFERRED EMBODIMENTS

Figure 1:
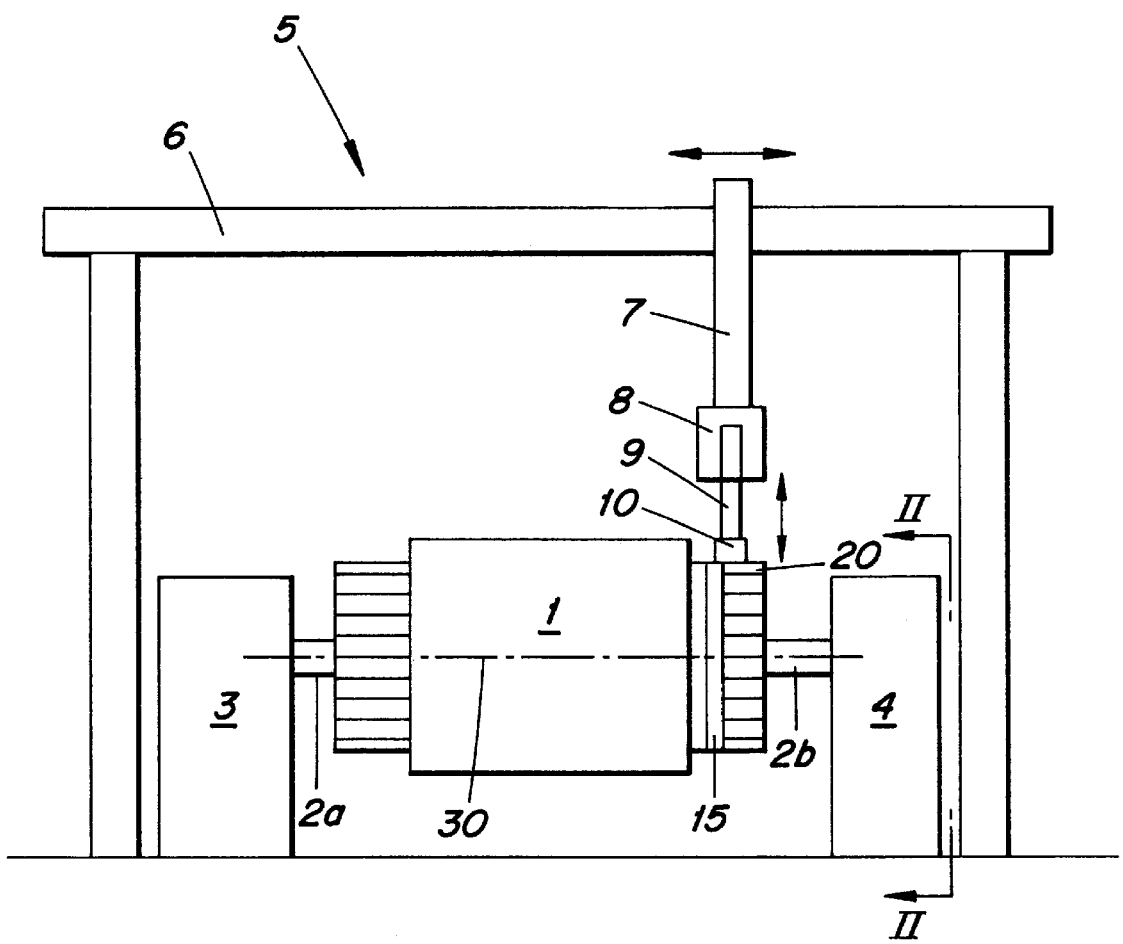
FIG. 1 shows a side view of a device according to the invention for the application of bindings to a winding overhang.

Referring now to the drawings, wherein like reference numerals designate identical or corresponding parts throughout the several views, in FIG. 1 a rotor 1 of an electric machine is rotatably supported with its shaft ends 2a, 2b on two bearing blocks 3, 4. Integrated in the bearing block 3 is a rotary device, not shown, by means of which the rotor 1 can be rotated about its rotor axis of rotation 30. Arranged above the rotor 1 is a portal frame 5, which runs parallel to the rotor axis of rotation 30. Arranged essentially vertically on the portal frame 5 is a support arm 7, the support arm 7 being able to be displaced horizontally over the transverse support 6 of the portal frame 5. Arranged on the lower end of the support arm 7, located opposite to the rotor 1, is a pressure cylinder 8. By means of the pressure cylinder 8 and a mounting 9, a head piece 10 can be moved vertically and pressed with an adjustable force against a winding overhang 20 of the rotor 1. The head piece 10 in this case serves to apply a thermoplastic fiber composite material tape 15 to the winding overhang 20.

Figure 2:
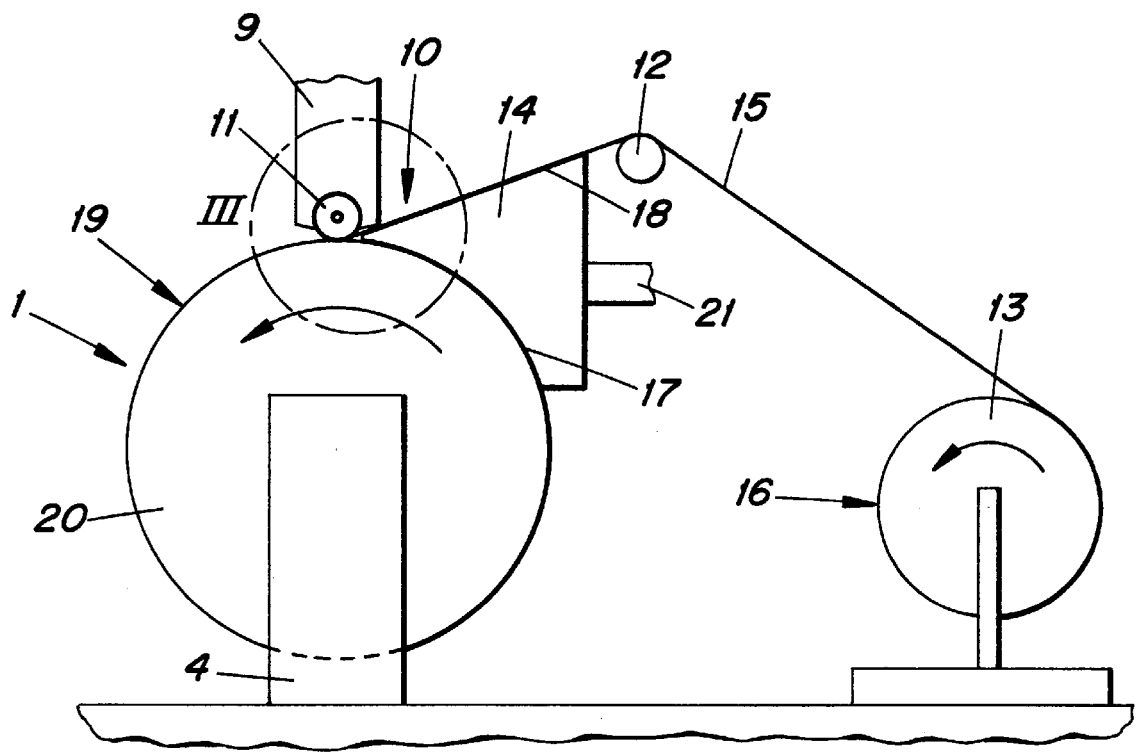
FIG. 2 shows a partial cross section through the device according to FIG. 1 along the plane II—II.
Figure 3:
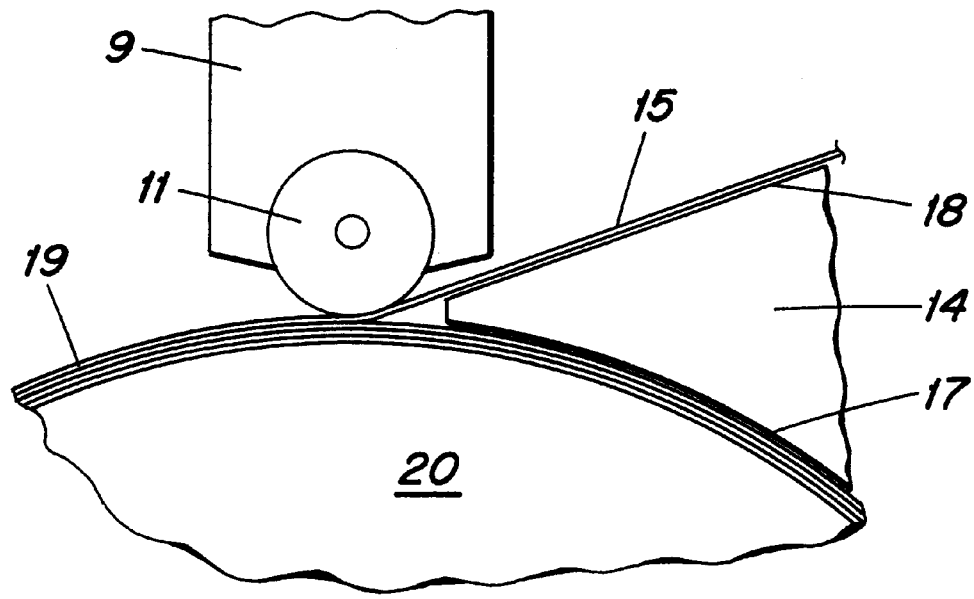
FIG. 3 shows the detail III from FIG. 2.

According to FIG. 2 and FIG. 3, the head piece 10 comprises a press roller 11, a guide roller 12 and a heating device 14. The elements 11, 12, 14 of the head piece 10 are connected to one another via mountings which are not shown. The thermoplastic fiber tape 15 is unwound from a binding material reel 13 via an unwind device 16. The thermoplastic fiber tape 15 is then led over the guide roller 12 to the heating device 14. There, the thermoplastic fiber tape 15 is heated by means of a heating element 18, at least on that surface facing the heating device 14, to at least the melting point of the thermoplastic matrix of the thermoplastic fiber tape 15. By means of the press roller 11, the thermoplastic fiber tape 15 is pressed onto the winding overhang 20 and is cooled, so that it bonds firmly on the winding overhang 20. The rotational speed of the unwind device 16 is in this case less than that of the rotor 1, by which means the unwind device 16 exerts an adjustable tensile force on the thermoplastic fiber tape 15. The fiber tape 15 is thus applied to the winding overhang under a specific pretension. Once a first web of the thermoplastic fiber tape 15 has been applied to the winding overhang 20, the outer surface, facing away from the winding overhang, of the thermoplastic fiber tape 15 which is located on the winding overhang is heated by a heating element 17 of the heating device 14, likewise to at least the melting point of the thermoplastic matrix. This results in the two mutually facing surfaces of the thermoplastic fiber tape 15 being melted, and optimum welding is produced at the press roller 11. As a result of the application of the thermoplastic fiber tape 15, an at least one-layer binding 19 is thus produced which has an appropriate pretension. The heating elements 17, 18 are supplied with hot air via an air supply, for example.

According to the invention, the binding material is composed of thermoplastic fiber composite material tapes. These tapes comprise a thermoplastic matrix with fibers embedded therein, the fiber content being able to amount to over 60%. Any thermoplastics which satisfy the corresponding requirements can be used as the thermoplastic matrix, preferably aromatic plastics, in particular polyetherether ketone or polyether imide. Any desired fibrous materials which have a correspondingly desired tensile strength can be used as fibers, preferably carbon fibers or glass fibers.

TABLE 1

| Ex. | Material | Fiber type | Matrix | Density (g/cm³) | Tensile strength (MPa) | Modulus of elasticity (GPa) |
|---|---|---|---|---|---|---|
| a | QLG4068 | Glass | PPS | 1.65 | 1110 | 44 |
| b | QLC4160 | Carbon | PPS | 1.5 | 1837 | 114 |
| c | QLC4064 | Carbon | PPS | 1.5 | 1950 | 121 |
| d | PEI-S2 | Glass | PEI | 1.6 | 1170 | 55 |
| e | APC2-S2 | Glass | PEEK | 1.6 | 1170 | 55 |
| f | APC2-AS4 | Carbon | PEEK | 1.5 | 2070 | 140 |
| g | Polyglass | Glass | Polyester | 1.6 | 800–1200 | 40–60 |

The material properties of some selected examples of thermoplastic fiber composite material tapes are illustrated in Table 1. The tapes illustrated in the table comprise glass or carbon fibers and a matrix made of polyphenylenesulfide (PPS), polyether imide (PEI) or polyetherether ketone (PEEK). The tapes with the designations a, b, c are produced by the Quadrax company, the tapes with the designations d, e, f are produced by the ICI Fiberite company. Example g serves as a comparative example having a thermosetting matrix, which is produced by the Isola von Roll company.

The maximum temperature of use of the tapes from Example a, b, c, d and g is about 200° C., that of Examples e and f is approximately 240° C. PEEK is normally processed at about 400° C. and PPS at about 340° C.

Figure 4:
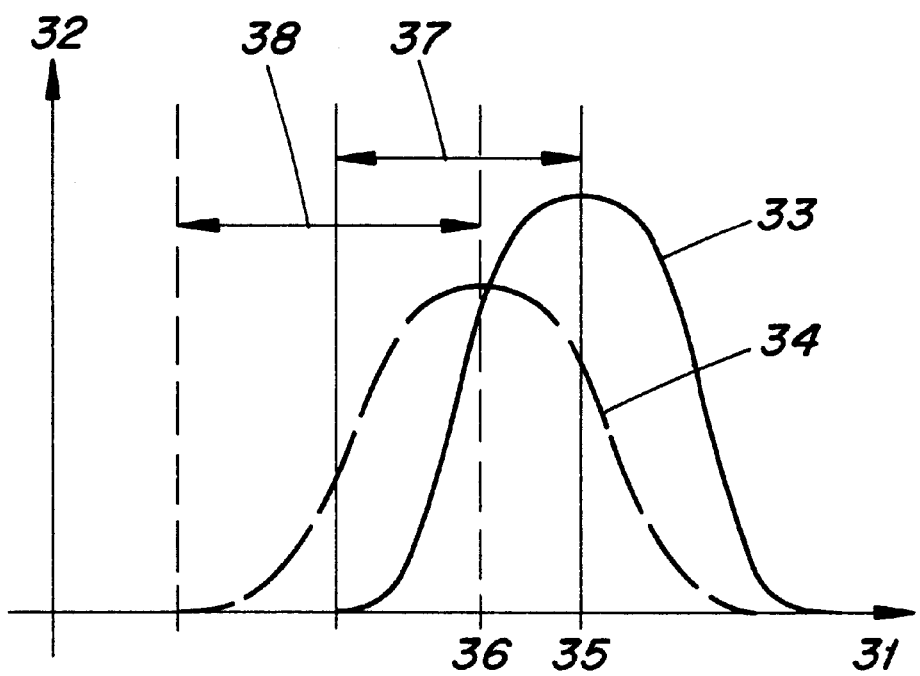
FIG. 4 shows a pretension distribution curve.

In FIG. 4, a pretension 31 which is applied during the processing of fiber tapes is plotted against a distribution of the remaining pretension 32. For a distribution curve 33 of a thermoplastic fiber tape 15, a mean value 35 lies higher than that mean value 36 for a distribution curve 34 of a thermosetting fiber tape. A safety margin 37 for the thermoplastic fiber tape 15 is smaller than a safety margin 38 of the thermosetting tape, that is to say the variance of the curve 33 of the thermoplastic fiber tape is smaller than that of the curve 34. This can be explained by the fact that during the processing of the thermoplastic fiber tapes, only very low losses of pretension are produced as a result of relaxations. Experiments have shown that the remaining pretension for thermoplastic bindings is at least between 70–100% of the original pretension. As a result, in order to produce a binding having a specific pretension, fewer turns of the thermoplastic fiber tape are needed in comparison with thermosetting fiber tape, as emerges from the following Table 2.

TABLE 2

| Fiber type | Glass fibers | Carbon fibers |
|---|---|---|
| Number of turns of thermoplastic fiber tape as a ratio of the number of turns of thermosetting fiber tape with glass fibers | <0.7 | <0.4 |

It can be seen from Table 2 that, for example when thermosetting bindings with glass fibers are replaced by thermoplastic bindings with carbon fibers, the thickness of the binding can be reduced by more than the factor 2.5. As a result, steel bindings which were previously used can be replaced by thermoplastic bindings.

Figure 5:
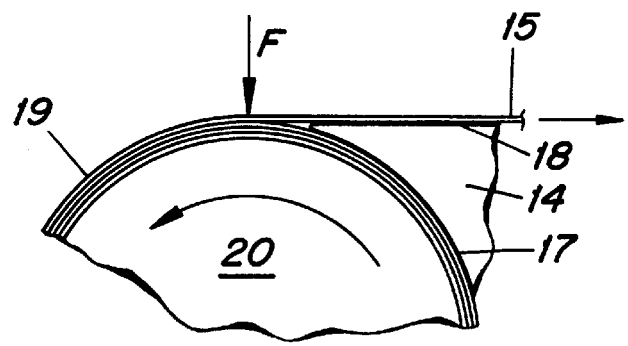
FIG. 5 show a further device according to the invention for the application of bindings to a winding overhang, without a press roller.

According to FIG. 5, the thermoplastic fiber tape 15 can be applied by means of a connecting force F without a press roller 11, in particular in the case of relatively small winding overhangs 20, that is to say in the case of winding overhangs having small radii. The connecting force F is in this case proportional to the tension applied to the tape 15 and inversely proportional to the radius of the winding overhang 20. In this case it must be taken into account that the radius of the winding overhang is predetermined by the parameters of the electric machine, and that the maximum tension which can be applied to the tape 15 is determined by the tensile strengths in accordance with Table 1. Wherever the radius of the winding overhang is sufficiently small and the applicable tension is sufficiently large, it is thus possible to dispense with the press roller according to FIGS. 2 and 3. As a result, the application process has fewer process variables and is greatly simplified thereby, which also saves investment costs. A further advantage is that the method is less dependent on the geometry and topology of the conductor bars of the winding overhang.

Cap rings of generators and motors, which serve to retain and support the winding overhang, can also be replaced by bindings made of thermoplastic fiber tapes. This is made possible by the excellent mechanical properties of the thermoplastic fiber tapes, and by the low thickness of the bindings produced therefrom.

The invention is of course not restricted to the exemplary embodiment shown and described. By means of the thermoplastic fiber tapes, the bindings can also be constructed from individual rings. This has the advantage that the heat produced in the rotor can be dissipated via the interspaces between the rings.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of producing bindings (19) for winding overhangs (20) of rotors (1) of electric machines, at least one layer of tapes (15) made of a composite of fibers and plastic matrix being applied with a pretension to the winding overhang (20), wherein a tape (15) made of a thermoplastic matrix with fibers inlaid therein is unwound via an unwind device (16), wherein the tape (15) is applied to the winding overhang (20) via a head piece (10) which comprises at least one heating device (14), the thermoplastic fiber tape (15) being heated by the heating device (14), at least on that side facing the winding overhang (20), beyond the melting point of the plastic matrix and the tape (15) subsequently being applied to the winding overhang (20) and cooled below the melting point of the plastic matrix.

2. The method as claimed in claim 1, wherein the head piece (10) comprises at least one heating device (14) and a press roller (11), and the tape (15) is pressed onto the winding overhang (20) by means of the press roller (11).

3. The method as claimed in claim 2, wherein the tape (15) pressed onto the winding overhang (20) is cooled below the melting point of the plastic matrix by means of the press roller (11).

4. The method as claimed in claim 1, wherein the thermoplastic fiber tape (15) applied to the winding overhang (20) is heated by the heating device 14, at least on that side facing away from the winding overhang (20), beyond the melting point of the plastic matrix.

* * * * *